US010490099B2

(12) United States Patent
Zavesky et al.

(10) Patent No.: US 10,490,099 B2
(45) Date of Patent: Nov. 26, 2019

(54) MANIPULATION OF MEDIA CONTENT TO OVERCOME USER IMPAIRMENTS

(71) Applicant: AT&T Intellectual Property I, LP, Atlanta, GA (US)

(72) Inventors: Eric Zavesky, Austin, TX (US); Amy Ruth Reibman, Chatham, NJ (US); David Crawford Gibbon, Lincroft, NJ (US); Bernard S. Renger, New Providence, NJ (US); Zhu Liu, Marlboro, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 610 days.

(21) Appl. No.: 14/090,055

(22) Filed: Nov. 26, 2013

(65) Prior Publication Data

US 2015/0149902 A1    May 28, 2015

(51) Int. Cl.
*G09B 21/00* (2006.01)
*H04N 21/2343* (2011.01)
(Continued)

(52) U.S. Cl.
CPC ......... *G09B 21/001* (2013.01); *G09B 21/008* (2013.01); *H04N 21/23439* (2013.01);
(Continued)

(58) Field of Classification Search
CPC ............................... G06F 3/048; G06F 3/0484
(Continued)

(56) References Cited

U.S. PATENT DOCUMENTS

| 5,821,989 A | 10/1998 | Lazzaro et al. |
| 5,963,371 A | 10/1999 | Needham et al. |

(Continued)

FOREIGN PATENT DOCUMENTS

| CN | 1529831 A | 9/2004 |
| EP | 2048803 A2 | 4/2009 |

(Continued)

OTHER PUBLICATIONS

"The present state of ultra-high definition televison", Report ITU-R BT.2246-2, Nov. 2012, 88 pages.
(Continued)

*Primary Examiner* — Angie Badawi
(74) *Attorney, Agent, or Firm* — Guntin & Gust, PLC; Atanu Das

(57) ABSTRACT

A system, process and software that incorporate the subject disclosure may include, for example, identifying a condition that causes an impaired perception of an original media content item during a presentation. A media content modification is determined, wherein application of the media content modification to the original media content item results in a modified media content item. The modified media content item, when presented to the media presentation device, ameliorates the impaired perception of the media content item. The media content modification is applied to the original media content item resulting in the modified media content item. The modified media content item is presented at the media presentation device contemporaneously with the original media content item, allowing different viewers to observe the modified media content item simultaneously with the original. Other embodiments are disclosed.

20 Claims, 6 Drawing Sheets

(51) Int. Cl.
*H04N 21/25* (2011.01)
*H04N 21/258* (2011.01)
*H04N 21/643* (2011.01)

(52) U.S. Cl.
CPC ..... *H04N 21/251* (2013.01); *H04N 21/25883* (2013.01); *H04N 21/64322* (2013.01)

(58) Field of Classification Search
USPC .......................................................... 715/716
See application file for complete search history.

(56) References Cited

U.S. PATENT DOCUMENTS

| | | | |
|---|---|---|---|
| 6,529,209 B1 | 3/2003 | Dunn et al. | |
| 6,959,389 B1 | 10/2005 | Dunn et al. | |
| 6,980,177 B2 | 12/2005 | Struyk | |
| 7,191,338 B2 | 3/2007 | Stern et al. | |
| 7,319,755 B2 | 1/2008 | Struyk | |
| 7,620,565 B2 | 11/2009 | Abelow | |
| 7,673,241 B2 | 3/2010 | Sun et al. | |
| 8,132,733 B2 | 3/2012 | Peterson | |
| 8,201,080 B2 | 6/2012 | Basson et al. | |
| 8,446,462 B2 | 5/2013 | Shahraray et al. | |
| 8,447,162 B2 | 5/2013 | Schultz et al. | |
| 2003/0084442 A1 | 5/2003 | Kellner et al. | |
| 2003/0118183 A1 | 6/2003 | Struyk | |
| 2006/0041758 A1 | 2/2006 | Dunn et al. | |
| 2006/0126156 A1 | 6/2006 | Evans et al. | |
| 2006/0139234 A1* | 6/2006 | Tanaka | H04N 13/0409 345/9 |
| 2008/0144967 A1 | 6/2008 | Struyk | |
| 2009/0244364 A1 | 10/2009 | Nonogaki | |
| 2010/0026794 A1 | 2/2010 | Chang | |
| 2010/0027765 A1* | 2/2010 | Schultz et al. | 379/52 |
| 2010/0079585 A1 | 4/2010 | Nemeth | |
| 2010/0237991 A1* | 9/2010 | Prabhu | G06F 3/03547 340/5.83 |
| 2011/0000967 A1* | 1/2011 | Labrec | G06K 19/08 235/488 |
| 2011/0090233 A1* | 4/2011 | Shahraray et al. | 345/520 |
| 2011/0183654 A1 | 7/2011 | Lanier et al. | |
| 2011/0234605 A1 | 9/2011 | Smith et al. | |
| 2012/0023518 A1 | 1/2012 | Bedingfield, Sr. et al. | |
| 2012/0047023 A1 | 2/2012 | Kruglick | |
| 2012/0194656 A1 | 8/2012 | Killian et al. | |
| 2013/0104029 A1* | 4/2013 | Hendry | G06F 17/2247 715/234 |
| 2013/0169620 A1 | 7/2013 | Choi et al. | |
| 2013/0173690 A1 | 7/2013 | Gregg et al. | |
| 2013/0223632 A1 | 8/2013 | Kim et al. | |
| 2015/0149902 A1 | 4/2015 | Zavesky | |

FOREIGN PATENT DOCUMENTS

| | | |
|---|---|---|
| JP | 64032332 U | 2/1989 |
| WO | 199742728 | 11/1997 |
| WO | 2003015406 | 2/2003 |

OTHER PUBLICATIONS

Sugawara, Masayuki, "Super Hi-Vision—research on a future ulta-HDTV system", EBU Technical Review, 2008.

Tanimoto, , "Multimedia Communications Technical Committee IEEE Communications Society", IEEE COMSOC MMTC E-Letter, vol. 6, No. 8, 2011.

"International Preliminary Report on Patentability", PCT/US14/64838, Jun. 9, 2016, 5 Pages.

* cited by examiner

100

MANIPULATION OF MEDIA CONTENT TO OVERCOME USER IMPAIRMENTS

RELATED APPLICATION(S)

U.S. Pat. No. 8,446,462, filed Oct. 15, 2009, by Behzad Shahraray et al., entitled "Method and System for Time-Multiplexed Shared Display." All sections of the aforementioned application(s) are incorporated herein by reference in its entirety.

FIELD OF THE DISCLOSURE

The subject disclosure relates to a manipulation of media content to overcome user impairments.

BACKGROUND

Media content items are routinely distributed to a wide variety of electronic devices include fixed in-home entertainment systems, conferencing systems, and mobile devices, such as tablet devices and mobile phones. Consumers of media content generally experience presentation of the media content according to a wide variety of different settings that can affect a consumer's experience.

Examples of media content include audio, video and, more generally, multimedia, e.g., including aspects of audio and video. Mobile consumers routinely experience a rich selection of multimedia features including streaming audio and/or streaming video by way of extensive Internet connectivity to their mobile devices. Likewise, home consumers also enjoy access to extensive catalogues of media according to rich broadcast schedules, and video on demand. Consumer experience will largely depend upon numerous factors, including contexts in which the media content is presented, devices upon which the media content is presented, and in some instances, characteristics of the consumers themselves, e.g., preferences.

BRIEF DESCRIPTION OF THE DRAWINGS

Reference will now be made to the accompanying drawings, which are not necessarily drawn to scale, and wherein.

DETAILED DESCRIPTION

Figure 1:
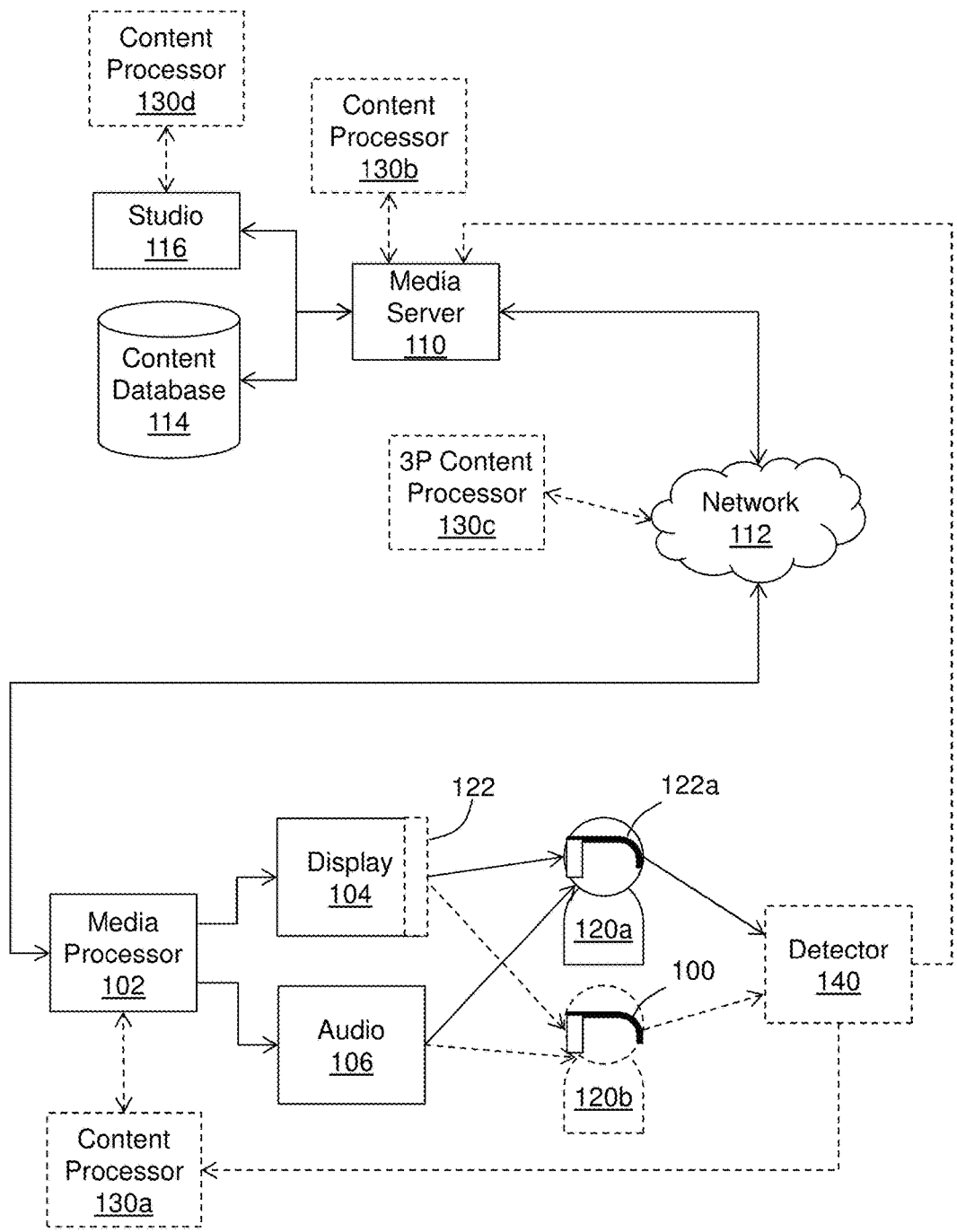
FIG. 1 depicts an illustrative embodiment of media processing system that compensates media content items.

It is conceivable that in at least some circumstances, one or more of the context, the device or the user can contribute to a consumer experience during presentation of the media content presentation that is substandard. By way of brief example, some factors that can impair media presentation experience include environmental conditions, such as ambient lighting and/or sound level, device conditions, such as display size and/or resolution, the nature of the content, e.g., animation, movie, or sports, and human preferences and/or impairments, such as individual disabilities.

The subject disclosure describes, among other things, illustrative embodiments of systems, processes and software that identify a condition including a human impairment that causes an impaired perception of an original media content item presented at a media presentation device. A modification is determined according to the condition, such that application of the modification to the original content item results in a modified content item that when viewed by a user experiencing the condition, ameliorates the impaired perception of the original media content item. Other embodiments are included in the subject disclosure.

One embodiment of the subject disclosure includes a process including identifying, by a system including a processor, a condition that causes an impaired perception of an original media content item during a presentation of the original media content item at a media presentation device. A media content modification is determined, wherein application of the media content modification to the original media content item results in a modified media content item that when presented to the media presentation device ameliorates the impaired perception of the media content item. The media content modification is applied to the original media content item resulting in the modified media content item. The modified media content item is presented at the media presentation device contemporaneously with the original media content item. The original media content item is observable at the media presentation device by a first user without the first user being able to observe the modified media content item. Likewise, the modified media content item is observable at the media presentation device by a second user experiencing the condition without the second user being able to observe the original media content item.

Another embodiment of the subject disclosure includes a system, having a processor and a memory that stores executable instructions. The executable instructions, when executed by the processor, facilitate performance of operations including identifying a condition that causes an impaired perception of an original media content item during a presentation of the original media content item at a media presentation device. A media content modification is determined, wherein application of the media content modification to the original media content item results in a modified media content item that when presented to the media presentation device ameliorates the impaired perception of the media content item. The media content modification is applied to the original media content item resulting in the modified media content item. The modified media content item is presented at the media presentation device contemporaneously with the original media content item. The original media content item is viewable at the media presentation device by a first user without the first user being able to view the modified media content item. Likewise, the modified media content item is viewable at the media presentation device by a second user experiencing the condition without the second user being able to view the original media content item.

Yet another embodiment of the subject disclosure includes a machine-readable storage medium including executable instructions. The executable instructions, when executed by a processor, facilitate performance of operations including identifying a condition that causes an impaired perception of an original media content item during a presentation of the original media content item at a presentation device. A media content modification is determined, wherein application of the media content modification to the original media content item results in a modified media content item. The modified media content item, when presented to the media presentation device, ameliorates the impaired perception of the media content item. The media content modification is applied to the original media content item resulting in the modified media content item. The modified media content item is presented at the media presentation device contemporaneously with the original media content item. The original media content is viewable at the media presentation device by a first user without the first user being able to view the modified media content. Likewise, the modified media content item is viewable at the media presentation device by a second user experiencing the condition without the second user being able to view the original media content.

Personalization of content can be utilized to match a condition, such as a person's impairments, localized viewing conditions, the content nature itself, and viewing device. In some embodiments, two or more duplicate presentations of the same media content item can be provided, with the duplicate item(s) modified to address the condition. Presentation and/or display of duplicate video content items can be accomplished by display devices having a resolution, screen-size, or pixel density, that is sufficient to display each of the duplicate items with an acceptable resolution and/or screen-size. This is particularly relevant for spatial multiplexing. For broadcast transport techniques, such as streaming video, sufficient visual space is required such that each of the duplicate items is delivered with an acceptable resolution and/or screen-size.

By way of example, a higher resolution video technology, such as high definition can be used to deliver duplicates of a lower resolution video technology, such as standard definition. Even greater resolution technology, such as ultra-high definition television (UDTV) can be used to deliver presentation of duplicate items with a lower resolution and/or screen size, such as high definition or standard definition. With UDTV streams, the extra visual space, or pixels, can be utilized to provide several versions of content without the need for specialized external equipment (e.g., glasses). In a room with five viewers, each viewer may be faced with individual viewing preferences: eliminating glare conditions from the room and ambient light, personal preference for certain scenes (e.g., blurry action scenes make this person dizzy), or individual impairments (astigmatism making edges of people or objects blurry). Until now, global changes could be made to the content playback device (e.g., higher contrast, brighter environment), but those changes do not uniformly improve viewing quality for each viewer. Additionally, in environments where users switch between different playback devices (from TV to personal mobile device), any or all of these conditions must be taken into consideration once more for the optimal viewing experience.

From a content provider perspective, an ability to provide duplicate media content items modified to address one or more various conditions including human impairments, would help the provider meet (and surpass) Americans with Disability Act and impairment regulations by personally addressing usability needs. Content creators would also benefit from such techniques, because they can specify visually critical aspects of their content (an actor or object should always appear particularly sharp) or dynamically adjust their content (an object should appear red in low light contexts and blue in bright light contexts).

FIG. 1 depicts an illustrative embodiment of a media processing system 100 that compensates media content items. The system includes a media processor 102, such as a set-top box, a display device 104 and an audio system 106. The media processor 102 is in communication with a media server 110 by way of an intervening network 112. The media server 110, in turn, is in communication with one or more of a media content database 114 or a media content source, such as a studio 116.

In operation, media content is obtained from one or more of the media content database 114 or the studio 116 and presented to the media processor 102 by way of the network 112. Without limitation, the network 112 can be a packet-switched network, such as the Internet, or a provider's network, such as a cable network. Although a single network 112 is illustrated, it is understood that the network 112 can include one or more networks implementing similar and/or different technologies. By way of brief example, a media processor 102 in a mobile device, such as a tablet device can communicate with a remote media server by way of a wireless mobile network with a cross connection to the Internet, allowing the mobile media processor to receive media content via a network 112 including at least the Internet and a local wireless mobile network.

In some embodiments, the media content server 110 is operated by a media content service provider, such as a cable service provider. The media content server 110 can obtain media content, e.g., broadcast or multicast content from a broadcast network. Alternatively or in addition, the media content server 110 can obtain media content from a stored media content repository, such as the media content database and/or the studio 116. Accordingly, the media content server 110 can provide media content items in a broadcast mode to a large number of individuals, and/or as a video on demand service, e.g., to individual user(s) as demanded by equipment of the users.

Media content items can include video and audio-video content, such as movies, television programs, and the like. Alternatively or in addition, the media content items can include audio and/or data. The media content, be it audio, video or audio-video, can be delivered to the media processor 102 according to any suitable transport protocol. Examples of such media content transport protocols include streaming media protocols, well suited for delivery of high-quality media content via a network, such as the packet switched network 112.

The media processor 102 can include set-top box devices, personal computing devices, and portable devices such as tablet devices or mobile phones, e.g., smartphones. Depending on the transport network, the media processor 102 can include a tuner, e.g., selectively to among a number of media distribution channels, e.g., on an over-the-air and/or cable network broadcast. The media processor 102 can also include one or more media decoders, such as a video decoder, an audio decoder, and a data decoder, e.g., closed captioning or subtitle decoder. An output of the video decoder is directed to the display device 104, e.g., presenting a sequence of frames of video content according to a playback schedule. Likewise, outputs of the other decoders, e.g., the audio decoder, are presented to other components, such as the audio system 106.

The media processor 102 can include suitable multimedia processing features to receiver, decode, buffer, and present media content to one or more of the display device 104 or the audio system 106. The multimedia processing features can be provided, e.g., as applications or "apps," media players, e.g., Windows® media player, ITunes®, Banshee, just to name a few. (Windows® Media Player and ITunes® are trademarks registered by Microsoft Corporation, and Apple Computer, Inc., respectively). The multimedia processing features can include extensible multimedia framework, such as, QuickTime®, commercially available from Apple Inc., Cupertino, Calif. (QuickTime® is a trademark registered by Apple Computer Inc.). A multimedia framework can offer an application program interface (API) and a modular architecture to easily add support for new audio, video and container formats and transmission protocols. The media content itself can be distributed in a compressed format, such as by using compression protocols according to the Moving Picture Experts Group (MPEG) audio and video compression and transmission standards. Digital audio standards include the MP3 encoding format.

A user 120a perceives presentation of the media content items at one or more of the display device 104 and the audio system. For coordinated audio-visual content, the presentations are synchronized to provide a sensible and comprehensible presentation to the user 120a. A quality and/or perceptibility of such presentations of media content items can be subject to one or more variables. By way of non-limiting example, a display of video can be impacted by an environment in which the video is being observed. Environmental factors or conditions can include one or more of illumination of a room, direct glare, e.g., of lighting and or sunlight. Other environmental conditions include a viewing location with respect to the display device 104, e.g., how far away, how high/low. Environmental factors with respect to audio can include ambient noise, acoustics of a presentation venue, e.g., echoes, user locations, and so forth.

One or more modifications or adjustments can be made in response to any such environmental conditions, with a goal of improving an experience of the user 120a during presentation of the media content items. Thus, a display illumination or contrast can be adjusted to improve viewability during high or low lighting conditions. Other features can include color and/or tint adjustments depending upon background lighting, etc., to provide an improved viewing experience. Likewise, presentation of the sound can be increased, decreased or otherwise adjusted according to current environmental conditions. Such modifications can be implemented by a user 120a, e.g., by adjusting controls of one or more of the media processor 102, the display device and the audio system 106. Unfortunately, such adjustments to the controls are applied globally, in that they impact presentation of audio and/or video adjustments to all users, e.g., a second user 120b, observing the same presentation of the media content item.

According to the techniques disclosed herein, multiplexing can be applied to one or more of the audio and/or the video presentations to allow multiple users 120a, 120b to observe the same subject matter of a media content item from a common display/and or audio system, while each observing the media content item according to a different adjustment and/or setting. Multiplexing of video can be accomplished, e.g., according to one or more of spatial filtering, temporal filtering or polarization filtering.

Temporal filtering can be accomplished, e.g., by interleaving video frame sequences of different presentations of the media content item. For example, two distinct presentations of the same media content item, e.g., each adjusted differently to accommodate one or more of the content, context, display or viewer conditions, can be presented simultaneously, by interleaving successive video frames, or groups of video frames. For example, even frames or even groups of frames may correspond to a first presentation; whereas odd frames or odd groups of frames may correspond to a second presentation.

Whether a viewer observes the even frames or odd frames can be accomplished with special goggles, or glasses having a shutter mechanism. Techniques for sharing a display, such as time multiplexed shared displays are disclosed in Published U.S. patent application Ser. No. 12/579,937, filed Oct. 15, 2009, by Brendan Y. Higa et al., entitled "Method and System for Time-Multiplexed Shared Display," issued as U.S. Pat. No. 8,446,462, the disclosure of which incorporated herein by reference in its entirety. The shutter mechanism can be synchronized with presentation of the video frames, such that a first pair of viewing glasses 122a allows the first viewer 120a to observe only the even video frames or even groups of video frames. Likewise, a second pair of viewing glasses 122b allows the second viewer 120b to observe only the odd video frames or odd groups of video frames. Thus, the first and second viewers 120a, 120b, can observe the same display device 104a presenting two independent presentations of the same media content item. One can be a presentation of the original media content item; whereas, the other can be a presentation of a modified version of the media content item.

Polarization filtering can be accomplished, e.g., by interleaving video frame sequences of different presentations of the media content item configured with different polarizations. For example, two distinct presentations of the same media content item, e.g., each presentation adjusted differently to accommodate one or more of the content, context, display or viewer conditions, can be presented simultaneously, by interleaving successive video frames, or groups of video frames. For example, even frames or even groups of frames corresponding to a first presentation are presented with a horizontal polarization; whereas, odd frames or odd groups of frames corresponding to a second presentation are presented with a vertical polarization.

Whether a viewer observes the even frames or odd frames can be accomplished with special goggles, or glasses having polarization filters. A first pair of viewing glasses 122a having horizontal polarization filters allows the first viewer 120a to observe only the even video frames or even groups of video frames. Polarized light from the odd video frames would be blocked by the polarization filters. Likewise, a second pair of viewing glasses 122b having vertical polarization allows the second viewer 120b to observe only the odd video frames or odd groups of video frames. Thus, the first and second viewers 120a, 120b, can observe the same display device 104a presenting two independent presentations of the same media content item. One can be a presentation of the original media content item; whereas, the other can be a presentation of a modified version of the media content item.

Spatial filtering can be accomplished, e.g., using a specialized display surface 122 configured to provide independent views of the same media content. For example, the display surface 112 can include a lenticular lens filter applied to the surface of the display device 104. The lenticular lens can be aligned with the pixel array of the display device in a defined manner, such that regions of the display 104 are projected according to predetermined viewing angles, allowing more than one independent viewing angle. The lenticular lenses can be formed as an array of cylindrical lenses molded in a plastic substrate. When placed over the pixels of the display surface, different columns of pixels, e.g., alternating columns or alternating groups of columns of pixels project into different angular regions defined in front of the display device 104, without projecting into other angular regions.

Figure 2:
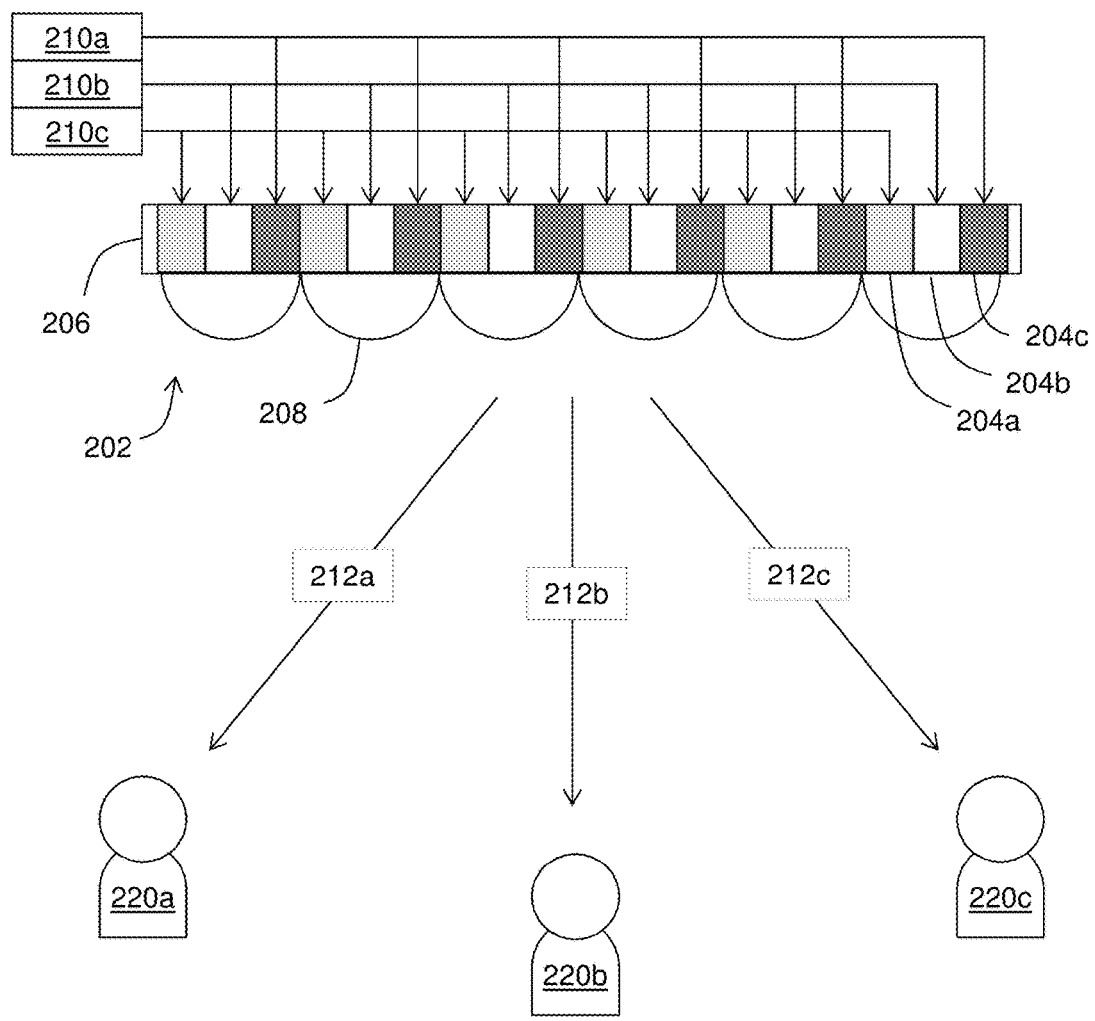
FIG. 2 depicts an illustrative embodiment of a display device operating in portions of the system described in FIG. 1.

Referring to FIG. 2, a schematic illustration is shown of an example of a viewing scenario 200 for a lenticular lens display 202. The display 202 includes a pixelated display 206, e.g., having a rectangular grid of pixels according to one or more of a screen size and a resolution. A lenticular lens 208 including an array of cylindrical and/or prism lenses is placed along an illuminated side of the pixelated display 206. The lenticular lens 208 displays a first portion of the pixelated display 206 into a first angular region 212a, e.g., observable by a first viewer 220a, but not by a second and third viewers 220b, 220c. Likewise, the lenticular lens 208 displays a second portion of the pixelated display 206 into a second angular region 212b, e.g., observable by the second viewer 220b, but not viewable by the first and third viewers 220a, 220c. The lenticular lens 208 displays a third portion of the pixelated display 206 into a third angular region 212c, e.g., observable by the third viewer 220c, but not viewable by the first and second viewers 220a, 220b. Whether the first, second or third viewers 220a, 220b, 220c observe a particular region, depends upon the viewer's location with respect to the lenticular lens 208. In the illustrative example, three rays 212a, 212b, 212c related generally to different viewing directions defining regions within which the different views can be observed.

In order to project the same media content item into the different viewing regions 212a, 212b, 212c, the pixels are driven according to a predetermined arrangement. In the simplistic example, a first column of pixels 204a provides a column of an image of a first presentation of the media content item directed along the first viewing angle 212a to the first viewer 220a. Likewise, a second column of pixels 204b provides a column of an image of a second presentation of the media content item directed along the second viewing angle 212b to the second viewer 220b, and a third column of pixels 204c provides a column of an image of a third presentation of the media content item directed along the third viewing angle 212c to the third viewer 220c. Alternating rows of pixels provide the different viewing angles and collectively provide a complete and independent presentation of the media content item to each of the three viewers 220a, 220b, 220c.

In the illustrative example, an array of the first columns of pixels 204a are driven by a first driver circuit 210a, an array of the second columns of pixels 204b are driven by a second driver circuit 210b and an array of the third columns of pixels 204c are drive by a third driver circuit 210c. One or more of the driver circuits 210a, 210b, 210c can be driven by a display processor to display a number of different presentations of the same media content to more than one viewers simultaneously and independent. Thus, if the first viewer 220a prefers a vibrant color presentation at high illumination, the first viewer 220a can perceive the media content item according to the preferences. Likewise, if the second viewer prefers a muted color presentation at lower illumination, the second viewer 220b can perceive the same media content item according to the different preference. It is apparent that some resolution will be lost in such an approach. In the illustrative, ⅓ of the display pixels will be dedicated to presenting each of the three separate presentations. Thus, any one of the presentations would have about ⅓ the resolution possible if all pixels were dedicated to a single presentation. Fortunately, many newer displays contain large numbers of pixels arranged in a very high density. Some examples of standard resolutions include standard definition, e.g., at 720 pixels wide and 480 pixels high. High definition resolutions include a greater number of pixels, e.g., 1920×1080 pixels or 1280×720 pixels, while ultra-high definition standards, e.g., UHD includes resolutions of 3840×2160 (e.g., 4×UHDTV), 7680×4320 (8×UHDTV). Thus, it would be possible to arrange a lenticular lens 208 in front of a high definition display, while still presenting images to three simultaneous view angles having at least standard definition resolution. With the growth of ultrahigh definition technology, a greater number of multiplexed views and/or resolution will be obtainable.

According to any of the techniques for sharing the display device 104, special processing can be applied to prepare or otherwise multiplex the media content before presenting the media content to the display device 104. For example, with spatial filtering, processing can be applied to arrange one of the streaming media content or the rendered video frames such that the columns of pixels present the multiple independent views. Likewise, with temporal filtering, processing is used to interleave the frames according to a shutter sequence, e.g., every other frame, every $3^{rd}$ frame, $4^{th}$ frame, etc. With respect to polarization filtering, successive frames are adjusted according to the different polarizations as disclosed above.

The system 100 of FIG. 1 includes a user media content processor 130a in communication with the media processor 102. The user media content processor 130a can be an independent device, as shown, or integrated within the media processor 102. It is conceivable that a provider media content processor 130b can be provided by the provider, e.g., at the media content server 110. Alternatively or in addition, a source media content processor 130d can be provided at the media content generator, e.g., the studio 116 or at some other location, e.g., a third-party media content processor 130c accessible as a service over the network.

Accordingly, different versions of an original media content item, e.g., obtained from a studio 116 or a content database 114 can be modified or otherwise processed by the source content processor 130d. The processing can occur at a time of capture, e.g., during filming and/or post-production, or at a time of long-term storage, e.g., into the media content database. Thus, different presentations can be prepared, stored and/or disseminated according to the techniques disclosed herein to independently present multiple views to different users.

In addition to environmental conditions and/or user preferences, personalization of media content items can be accomplished to match a person's impairments to a presentation. For example, an individual inflicted with color blindness might be unable to distinguish between certain colors, such as red and green. In order to improve an impaired viewer's experience, it is possible to adjust the colors, either globally, e.g., for the entire display of the media content item, or for one or more portions of the display.

By way of example, a game show might display a game board depicting correct and incorrect answers in the game according to a color scheme. A green button, e.g., a green graphic item within the display area, might signify a correct response; whereas, a red button or graphic item might signify an incorrect answer. With nothing more than a color to go on, a viewer inflicted with red-green colorblindness would be unable to distinguish between correct and incorrect responses and therefore unable to follow the program.

An individual can identify himself/herself as having the red-green colorblindness infliction. This can be accomplished in any suitable manner, including by way of a detector 140. The detector 140 can be a separate standalone device or integrated in one or more devices, such as the content processor 130*a* or the media processor 102. The detector 140 can determine the individual and the corresponding infliction, e.g., by user entry at the detector 140.

Having detected the user 120*a* as being present at the display 104 and determined that the user 120*a* is subjected to the infliction, the content processor 130*a* can make adjustments to the original media content item, e.g., to substitute the red and green colors with other colors that are easily perceptible. Such colors might be black and white, blue and yellow, or any such suitable colors. The original media content item can be adjusted in whole, e.g., by substituting a color palette for the video with colors that are more readily distinguishable. Alternatively or in addition, such color substitutions can be restricted to an identified region of a display of the original media content. For example, the color substitutions in the game show example can be restricted to a display of the game board or similar graphic, without making color substitutions to other portions of the display image.

Alternatively or in addition, such color substitutions can be made for an entire image, except for one or more identifiable features within the image. Thus, colors can be substituted, e.g., for red and green, according to a user's impairment to improve presentation of the media content item to the user. However, such substitutions might interfere with certain features, such as faces of individuals. Thus, facial recognition can be applied during processing by the content processor 130*a* to allow color substitutions to occur within the entire display area, except for any face(s).

By way of non-limiting example, other user inflictions cause a viewer to become dizzy or nauseous when viewing certain scenes. Examples include fast moving scenes, e.g., in a blurry scene segment resulting from quick movement in a video scene. Processing at the content processor 130*a* can include a means to detect such rapid movement, and in response, adjust the video frames presented to the display to provide a series of frames in sequence that holds certain frames before progressing to several frames ahead resulting in a type of stop-motion presentation to effectively remove the appearance of fast movement. Other examples include jittery scenes, e.g., to simulate news reel footage. Such jittery or jerky motion can be detected in a scene and filtered or otherwise processed to provide greater stability to the portrayed scene. Yet other processing embodiments for this infliction may involve image mosaics, e.g., tiling multiple frames to a larger, still, and fixed frame, temporally blurring (or sharpening) the questionable frames. Yet another embodiment can manipulate frames by identifying matching sub-regions within a frame and cropping subsequent frames so that a camera-steady appearance is presented to the user.

Other user inflictions include visual impairment, such as astigmatism, sensitivity to light, and so forth. Generally well known image and video filtering and processing techniques can be applied to otherwise modify the image to improve perception by a viewer having such impairment. Thus, for a viewer with astigmatism, the image can be processed, e.g., to sharpen or otherwise enhance edges.

Referring again to the detector 140, any of various techniques can be implemented to allow the system 100 to determine one or more of a presence of an individual, the identity of the individual, or the particular condition or impairment to be addressed by the system 100. In some embodiment, a user nominates himself/herself. The nomination might simply be providing a user identity, an association with the user identity and one or more user impairments and/or preferences having been predetermined, e.g., stored in a user profile. The nomination might further include identification of a particular impairment and/or preference, e.g., "I'm color blind," or "I am deaf in my left ear." The nomination information is passed to one or more of the content processors 130*a*, 130*b*, e.g., by way of another device, such as the media server 110.

Any suitable technique can be used to identify one or more of particular individuals or impairments of users then present during presentation of the media content item. By way of non-limiting example, the detector 140 can include biometric sensor, such as a voice fingerprinting capability, a fingerprinting capability, a facial recognition capability, a sensor, such as a radio frequency identification (RFID), optical bar code, or QR code reader, near field scanner, or the like reading a suitable identifying tag provided by the individual.

Although the examples provided above deal primarily with video, it is understood that the similar techniques can be applied to audio. Thus, a particular user's preference(s) and/or impairment(s) can be identified, such that the content processor 130*a* modifies the original media content item to produce a modified content item adapted to improve a user's experience during presentation of the modified media content. Examples of sound processing include one or more of adjusting a volume, a dynamic range, a frequency range, a balance, and so forth. Presentation of the adjusted audio can be provided by the audio system 106, and/or by glasses 122*a* including headphones. Individual headphones are well suited to targeting presentation of modified audio to a particular individual. It is possible, however, using audio processing to direct a modified audio presentation to a particular region, one side of a room, or a particular location within a room, while providing the original audio content, or separately adjusted audio content, to one or more other regions of the room.

Figure 3:
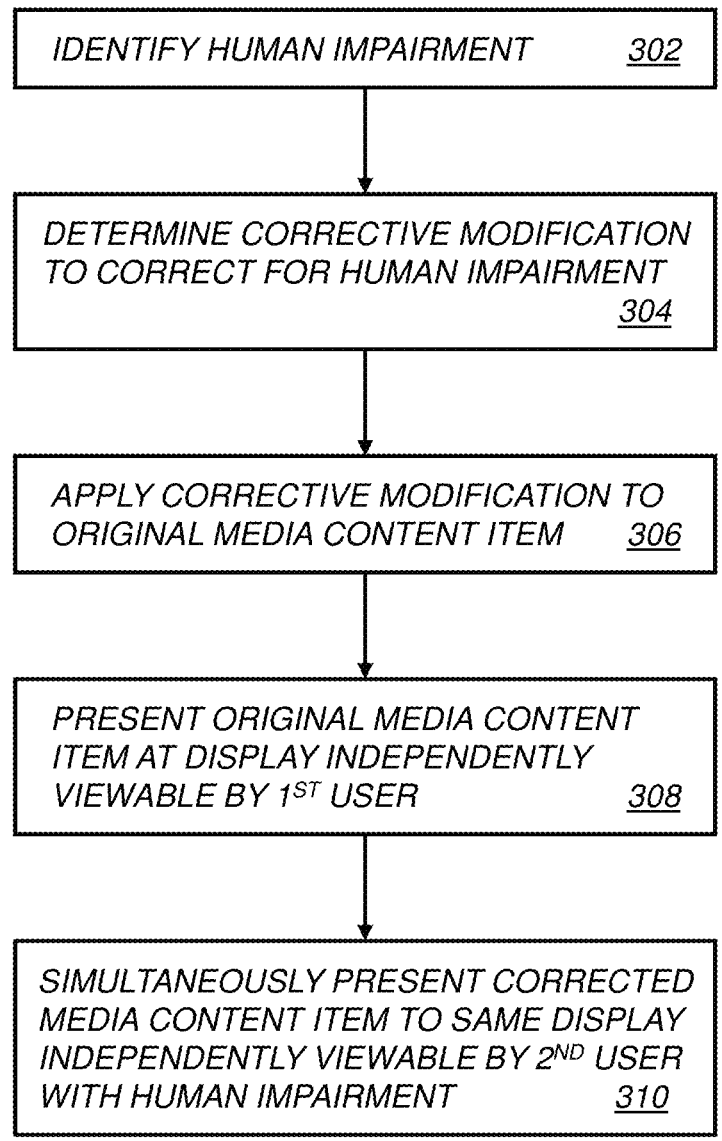
FIG. 3 depicts an illustrative embodiment of a process operating in portions of the system described in FIG. 1.

FIG. 3 depicts an illustrative embodiment of a process used by the media processing system of FIG. 1. A condition, such as a human impairment is identified at 302. This can include self-nomination of one or more viewers, identifying their particular condition or human impairment. This can also include identification of an identity of the individual allowing for determination of condition, preference or human impairment according to a predetermined association with the identified individual, e.g., according to a user profile. In some instances, a content source, such as a studio or a provider, such as the media server 110, can identify one or more particular conditions and/or human impairments that can be offered to a wider audience. For example, adjusting a color pallet according to red-green colorblindness might have wide appeal, so the processing can be performed at a video headend, or suitable distribution point.

A corrective modification to correct for human impairment is determined at 304. For example, a limited number of generally known human impairments can be identified and corrective modifications identified. The content processor and/or the display 104 or the audio system 106 can be configured with suitable resources, e.g., software, to perform the identified corrective modifications.

The corrective modifications are then applied to the original media content item at 306. The corrective modifications can be applied at one or more of the user's media processor 102, the service providers media server 110, a content source, such as a studio 116 or content database 114, or by a third party service provider.

The original media content item is presented at the display 104 and independently viewable by first user at 308. In at least some embodiments, the original media content item, however, is not viewable by a second user subject to the human impairment. The corrected media content item is simultaneously presented to the same display 104 independently viewable by the second at 310. In at least some embodiments, the corrected media content item is not viewable by the first user so as not to interfere with enjoyment by either party observing multimedia from the same display 104.

Figure 4:
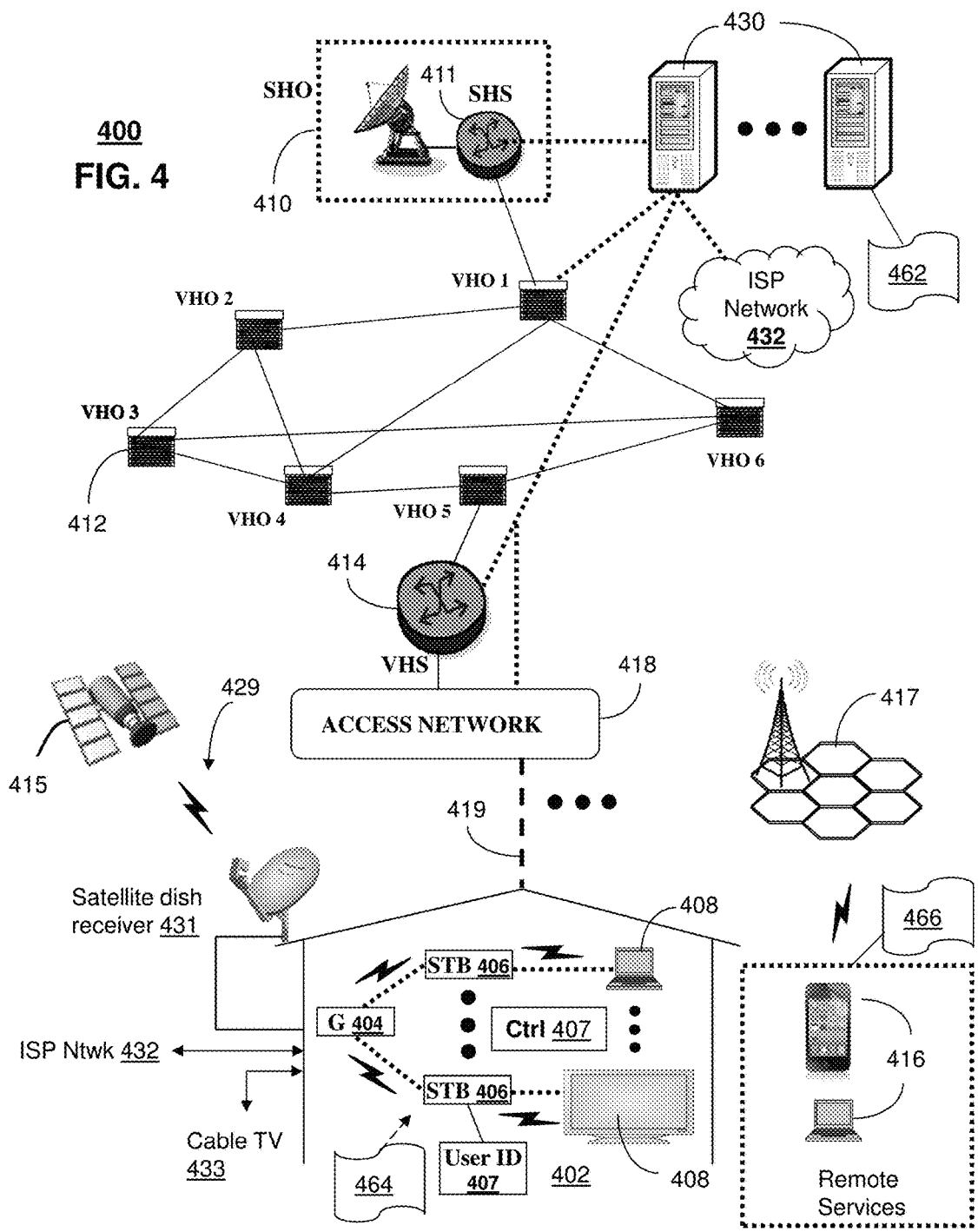
FIG. 4 depicts an illustrative embodiment of a communication system that provides media services including media content compensation as disclosed in FIG. 1.

FIG. 4 depicts an illustrative embodiment of a first communication system 400 for delivering media content. The communication system 400 can represent an Internet Protocol Television (IPTV) media system adapted to deliver multiple versions of a media content item to equipment of a subscriber. The multiple versions of the media content item include at least one version modified to address a condition, such as a human impairment, viewing condition or preference according to the techniques disclosed herein. Communication system 400 can be overlaid or operably coupled with the system 100 figure of FIG. 1 as another representative embodiment of communication system 400. A condition can be identified that includes a human impairment causing an impaired perception of an original media content item when presented at a media presentation device. A modification is determined according to the condition, such that application of the modification to the original content item results in a modified content item that when viewed by a user experiencing the condition, ameliorates the impaired perception of the original media content item.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media content processor (herein referred to as personalization processor 430). The personalization processor 430 can use computing and communication technology to perform function 462, which can include among other things, identifying a condition including a human impairment that causes an impaired perception of an original media content item when presented at a media presentation device. Function 462 also determines a modification according to the condition, such that application of the modification to the original content item results in a modified content item that when viewed by a user experiencing the condition, ameliorates the impaired perception of the original media content item. The media processors 406 and wireless communication devices 416 can be provisioned with software functions 464 and 466, respectively, to utilize the services of personalization processor 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
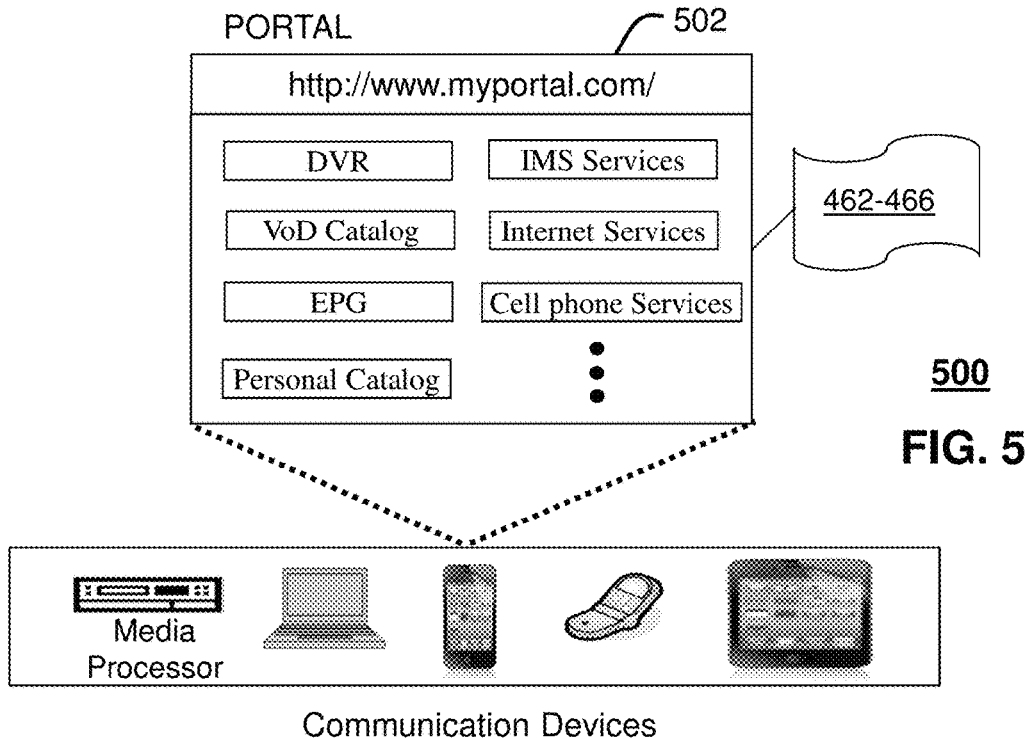
FIG. 5 depicts an illustrative embodiment of a web portal for interacting with the media processing system of FIG. 1 and the communication systems of FIG. 4.

FIG. 5 depicts an illustrative embodiment of a web portal 502 which can be hosted by server applications operating from the computing devices 430 of the communication system 400 illustrated in FIG. 4. The web portal 500 can be overlaid or operably coupled with system 100 and/or communication system 400 as another representative embodiment of the system 100 of FIG. 1, and/or the communication 400. The web portal 502 can be used to facilitate delivery of multiple versions of a media content item to equipment of a subscriber. For example, a subscriber can identify a condition, such as a human impairment, viewing condition or preference, causing the communication system 100, 400 to responds by providing a modified media content item addressing the identified condition. A condition can be identified, for example, that includes a human impairment causing an impaired perception of an original media content item when presented at a media presentation device. A modification is determined according to the condition, such that application of the modification to the original content item results in a modified content item that when viewed by a user experiencing the condition, ameliorates the impaired perception of the original media content item. The web portal 502 can be used for managing services of communication systems 400. A web page of the web portal 502 can be accessed by a Uniform Resource Locator (URL) with an Internet browser such as Microsoft's Internet Explorer® (a registered trademark of Microsoft Corporation), Mozilla's Firefox® (a registered trademark of the Mozilla Foundation), Apple's Safari™, or Google's Chrome™ using an Internet-capable communication device such as those described in FIGS. 1-2 and 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services, provisioning Internet services, provisioning cellular phone services, and so on.

The web portal 502 can further be utilized to manage and provision software applications 462-466 to adapt these applications as may be desired by subscribers and service providers of the communication system 400.

Figure 6:
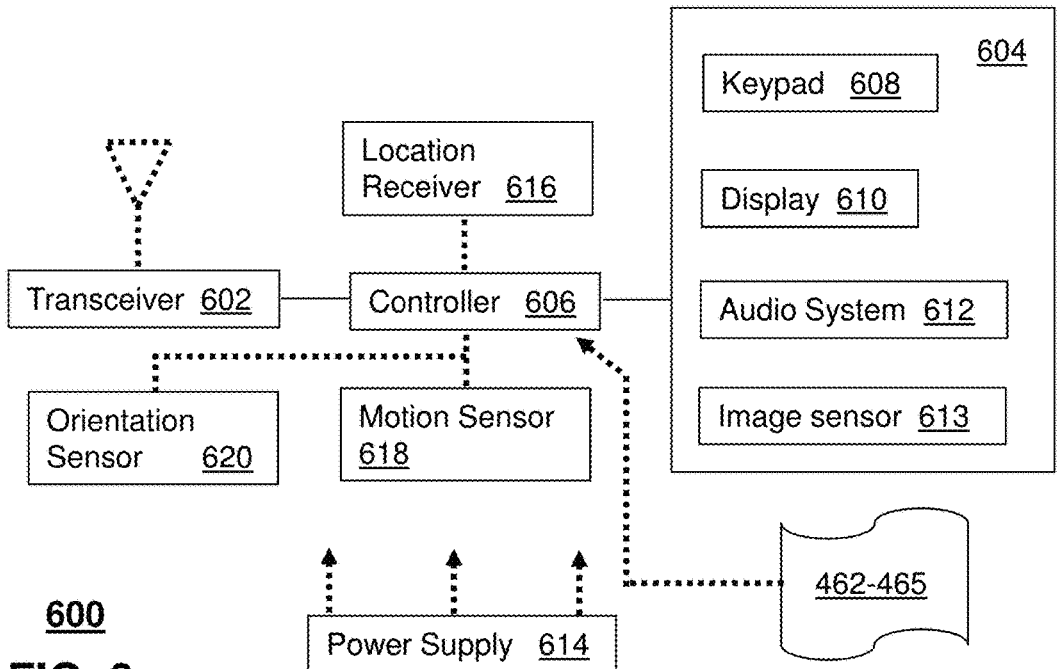
FIG. 6 depicts an illustrative embodiment of a communication device.

FIG. 6 depicts an illustrative embodiment of a communication device 600. The communication device 600 can serve in whole or in part as an illustrative embodiment of the devices depicted in FIGS. 1 and 4. The communication device 600 can be configured to receive, coordinate and/or display multiple versions of a media content, including a version addressing a condition, such as a human impairment, viewing condition or preference. A condition can be identified that includes a human impairment causing an impaired perception of an original media content item when presented at a media presentation device. A modification is determined according to the condition, such that application of the modification to the original content item results in a modified content item that when viewed by a user experiencing the condition, ameliorates the impaired perception of the original media content item.

To enable these features, the communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 406, the media devices 408, or the portable communication devices 416 of FIG. 4. It will be appreciated that the communication device 600 can also represent other devices that can operate in the communication systems 400 of FIG. 4 such as a gaming console and a media player.

The communication device 600 shown in FIG. 6 or portions thereof can serve as a representation of one or more of the devices of system 100 of FIG. 1 and the communication system 400. In addition, the controller 606 can be adapted in various embodiments to perform the functions 462-466, respectively.

Upon reviewing the aforementioned embodiments, it would be evident to an artisan with ordinary skill in the art that said embodiments can be modified, reduced, or enhanced without departing from the scope of the claims described below. For example, the media content processor 130a can be connected to one or more of the display 104 or the audio system 106 to adjust features of presentation of the multimedia content as disclosed herein. Other embodiments can be used in the subject disclosure.

One or more of the exemplary embodiments can ameliorate the impaired perception of the original media content item, where the amelioration can improve or make better, in whole or in part, the impaired perception.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
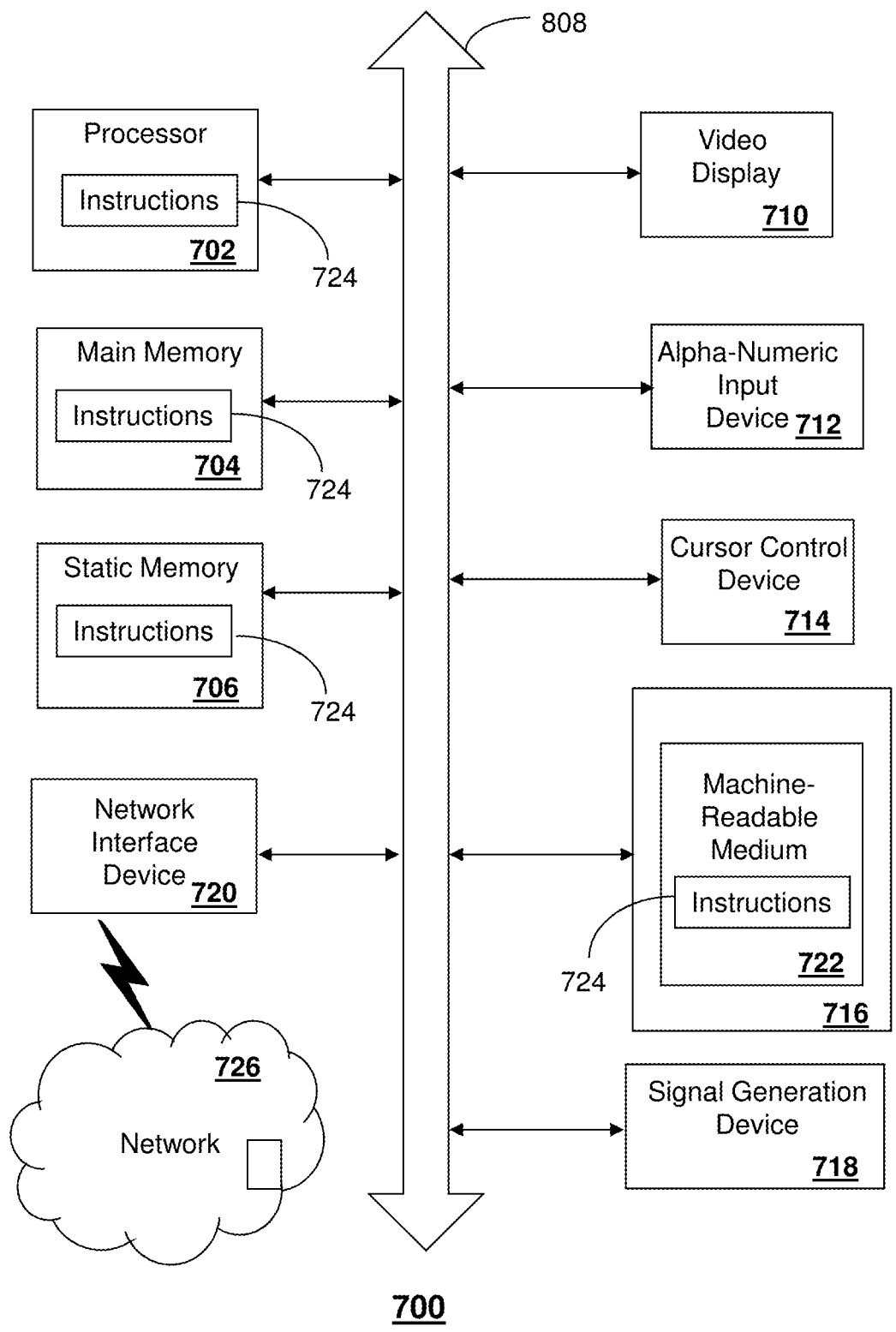
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the personalization processor 430, media processor 406, the condition identification device 407, the media content processors 130a, 130b, 130c or the condition identification device 140. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible machine-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible machine-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible machine-readable storage medium 722 is shown in an example embodiment to be a single medium, the term "tangible machine-readable storage medium" should be taken to include a single medium or multiple media (e.g., a centralized or distributed database, and/or associated caches and servers) that store the one or more sets of instructions. The term "tangible machine-readable storage medium" shall also be taken to include any non-transitory medium that is capable of storing or encoding a set of instructions for execution by the machine and that cause the machine to perform any one or more of the methods of the subject disclosure.

The term "tangible machine-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible machine-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. (Bluetooth® and ZigBee® are trademarks registered by the Bluetooth® Special Interest Group and the ZigBee® Alliance, respectively).

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

detecting, by a processing system including a processor, an indication of a first observer, second observer, and a third observer, present at a display device;

determining, by the processing system, a sensory impairment for the first observer, a first environment condition for the second observer, a second environment condition for the third observer, wherein the sensory impairment and each of the first environment condition and the second environment condition causes impaired perception of an original media content item during presentation of the original media content item at the display device, wherein the first environment condition comprises ambient light and the second environment condition comprises a distance from the display device;

determining, by the processing system, a first media content modification based on the sensory impairment, determining a second media content modification based on the first environment condition, and determining a third media content modification based on the second environment condition;

applying, by the processing system, the first media content modification to the original media content item to obtain a first modified media content item for viewing by the first observer, applying, by the processing system, the second media content modification to the original media content item to obtain a second modified media content item for viewing by the second observer, and applying, by the processing system, the third media content modification to the original media content item to obtain a third modified media content item for viewing by the third observer; and presenting, by the processing system, within a common display area of the display device a presentation of the first modified media content item, second modified media content item, and the third modified media content item simultaneously, wherein the presentation of the first modified media content item, the second modified media content item, and the third modified media content item, span in part the common display area, resulting in the common display area comprising an overlapping presentation of the first modified media content item, the second modified media content item, and the third modified media content item, wherein the presentation of the first modified media content item is observable by the first observer located at a first angular region with respect to the display device, wherein the presentation of the second modified media content item is observable by the second observer located at a second angular region with respect to the display device, wherein the presentation of the third modified media content item is observable by the third observer located at a third angular region with respect to the display device.

2. The method of claim 1, further comprising:

generating, by the processing system, a first media stream comprising the first modified media content item;

generating, by the processing system, a second media stream comprising the second modified media content item;

generating, by the processing system, a third media stream comprising the third modified media content item; and combining, by the processing system, the first media stream, the second media stream, and the third media stream resulting in a combined media stream, wherein the combined media stream is provided to the display device.

3. The method of claim 2, further comprising providing a lenticular lens in alignment with the common display area, wherein the common display area comprises the overlapping presentation of the first media stream, the second media stream, and the third media stream.

4. The method of claim 3, wherein the combining of the first media stream, the second media stream, and third media stream comprises multiplexing the first media stream, the second media stream, and the third media stream.

5. The method of claim 4, wherein a de-multiplexing of the first media stream, the second media stream, and the third media stream comprises applying one of a temporal filter, a spatial filter or a polarization filter.

6. The method of claim 1, further comprising receiving, by the processing system, an indication of one of a context of the presentation of the first modified media content item, second modified media content item, and the third modified media content item to the display device, a subject matter of the original media content item, an identity of the first observer, second observer, and the third observer, wherein the detecting of the indication of the first observer, the second observer, and the third observer comprises one of using a biometric sensor, or wirelessly reading an identifying tag.

7. The method of claim 1, wherein the determining of the sensory impairment comprises:

identifying, by the processing system, the first observer; and determining, by the processing system, the sensory impairment according to a predetermined association between the first observer and the sensory impairment.

8. A device, comprising:

a processing system including a processor; and a memory storing executable instructions that, when executed by the processing system, perform operations comprising:

detecting an indication of a first user, a second user, and a third user, present at a display device;

determining a sensory impairment for the first user determining a first environment condition for the second user, and determining a second environment condition for the third user, wherein the first environment condition comprises ambient lighting, wherein the second environment condition comprises a distance from the display device;

determining a first media content modification based on the sensory impairment;

applying the first media content modification to an original media content item to obtain a first modified media content item; and providing, over a communication network, the original media content item and the first modified media content item to a media processor communicatively coupled to the display device, wherein a media processor detects the first environment condition for the second user and detects the second environment condition for the third user, wherein the media processor adjusts the original media content item according to the first environment condition to obtain a second modified media content item associated with the second user, wherein the media processor adjusts the original media content according to the second environment condition to obtain a third modified media content item associated with the third user, wherein presentation of the first modified media content item, the second modified media content item, and the third modified media content item, span in part a common display area of the display device, resulting in the common display area comprising an overlapping presentation of the first modified media content item, the second modified media content item, and the third modified media content item, wherein the presentation of the first modified media content item is observable by the first user located at a first angular region with respect to the display device, wherein the presentation of the second modified media content item is observable by the second user located at a second angular region with respect to the display device, wherein the presentation of the third modified media content item is observable by the third user located at a third angular region with respect to the display device.

9. The device of claim 8, wherein the media processor generates a first media stream comprising the first modified media content item, wherein the media processor generates a second media stream comprising the second modified media content item, wherein the media processor generates a third media stream comprising the third modified media content item, wherein the media processor combines the first media stream, the second media stream, and the third media stream resulting in a combined media stream, wherein the combined media stream is provided to the display device.

10. The device of claim 9, further comprising a lenticular lens in alignment with the common display area, wherein the common display area comprises the overlapping presentation of the first media stream, the second media stream, and the third media stream.

11. The device of claim 10, wherein the media processor combining the first media stream, the second media stream, and the third media stream comprises the media processor multiplexing the first media stream, the second media stream, and the third media stream, and wherein the detecting of the indication of the first user comprises one of using a biometric sensor, or wirelessly reading an identifying tag.

12. The device of claim 11, wherein a de-multiplexing of the first media stream, the second media stream, and the third media stream comprises applying one of a temporal filter, a spatial filter or a polarization filter.

13. The device of claim 8, wherein the operations further comprise receiving an indication of one of a context of the presentation of the first modified media content item, the second modified media content item, or the third modified media content item to the display device, a subject matter of the original media content item, an identity of the first user, or the display device.

14. The device of claim 8, wherein the detecting of the sensory impairment comprises:
identifying the first user; and
determining the sensory impairment according to a pre-determined association between the first user and the sensory impairment.

15. A non-transitory machine-readable storage medium comprising executable instructions that, when executed by a system including a processor, perform operations, comprising:
detecting an indication of a first observer, a second observer, and a third observer are present at a media presentation device;
determining a user preference of the first observer based on the indication;
determining a sensory impairment for the first observer based on the user preference;
determining a first environment condition for the second observer, and determining a second environment condition for the third observer, wherein the first environment condition comprises ambient lighting and the second environment condition comprises a distance from the media presentation device;
determining a first media content modification based on the sensory impairment, determining a second media content modification based on the first environment condition, and determining a third media content modification based on the second environment condition;
applying the first media content modification to an original media content item to obtain a first modified media content item, applying the second media content modification to the original media content item to obtain a second modified media content item, and applying the third media content modification to the original media content item to obtain a third modified media content item, wherein the original media content item, the first modified media content item, the second modified media content item, and the third modified media content item convey a same subject matter; and
providing the original media content item, the first modified media content item, the second modified media content item, and the third modified media content item to a media processor communicatively coupled to the media presentation device, wherein presentation of the first modified media content item, the second modified media content item, and the third modified media content item, span in part a common display area of the media presentation device, resulting in the common display area comprising an overlapping presentation of the first modified media content item, the second modified media content item, and the third modified media content item, wherein the presentation of the first modified media content item is observable by the first observer located at a first angular region with respect to the media presentation device, wherein the presentation of the second modified media content item is observable by the second observer located at a second angular region with respect to the media presentation device, wherein the presentation of the third modified media content item is observable by the third observer located at a third angular region with respect to the media presentation device.

16. The non-transitory machine-readable storage medium of claim 15, wherein a media processor generates a first media stream comprising the first modified media content item, wherein the media processor generates a second media stream comprising the second modified media content item, wherein the media processor generates a third media stream comprising the third modified media content item, wherein the media processor combines the first media stream, the second media stream, and the third media stream resulting in a combined media stream, wherein the combined media stream is provided to the media presentation device.

17. The non-transitory machine-readable storage medium of claim 16, wherein the common display area comprises the overlapping presentation of the first media stream, the second media stream, and the third media stream in alignment with a lenticular lens.

18. The non-transitory machine-readable storage medium of claim 17, wherein providing of the combined media stream comprises multiplexing the first media stream, the second media stream, and the third media stream.

19. The non-transitory machine-readable storage medium of claim 18, wherein a de-multiplexing of the first media stream, the second media stream, and the third media stream comprises applying one of a temporal filter, a spatial filter or a polarization filter, and wherein the detecting of the indication of the first observer comprises one of using a biometric sensor, or wirelessly reading an identifying tag.

20. The non-transitory machine-readable storage medium of claim 15, wherein the operations further comprise receiving an indication of one of a context of the presentation of the first modified media content item, second modified media content item, or third modified media content item to the media presentation device, a subject matter of the original media content item, an identity of the first observer, or the media presentation device.

* * * * *